US012741525B2

(12) United States Patent
Adam et al.

(10) Patent No.: US 12,741,525 B2
(45) Date of Patent: Sep. 22, 2026

(54) MOTOR BEARING ASSEMBLY FOR A VEHICLE

(71) Applicant: Bayerische Motoren Werke Aktiengesellschaft, Munich (DE)

(72) Inventors: Michael Adam, Pliening (DE); Rainer Boehner, Olching (DE); Georg Rauch, Wertingen (DE); Dirk Schoenhuetl, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 290 days.

(21) Appl. No.: 18/701,280

(22) PCT Filed: Oct. 5, 2022

(86) PCT No.: PCT/EP2022/077710
§ 371 (c)(1),
(2) Date: Apr. 15, 2024

(87) PCT Pub. No.: WO2023/083530
PCT Pub. Date: May 19, 2023

(65) Prior Publication Data

US 2024/0424880 A1 Dec. 26, 2024

(30) Foreign Application Priority Data

Nov. 15, 2021 (DE) .................... 10 2021 129 638.2

(51) Int. Cl.
*B60K 5/12* (2006.01)

(52) U.S. Cl.
CPC .................................. *B60K 5/1233* (2013.01)

(58) Field of Classification Search
CPC ....... B60K 5/12; B60K 5/1233; B60K 5/1208
(Continued)

(56) References Cited

U.S. PATENT DOCUMENTS 4,858,879 A 8/1989 Miyamoto et al.
7,111,705 B2 * 9/2006 Ohta .................... F16F 13/101 267/141.1

(Continued)

FOREIGN PATENT DOCUMENTS

DE 81 32 963 U1 12/1985
DE 41 18 490 C1 5/1992

(Continued)

OTHER PUBLICATIONS

International Search Report (PCT/ISA/210) issued in PCT Application No. PCT/EP2022/077710 dated Feb. 21, 2023 with English translation (5 pages).

(Continued)

*Primary Examiner* — Timothy Hannon
(74) *Attorney, Agent, or Firm* — Crowell & Moring LLP

(57) ABSTRACT

A motor bearing assembly for a vehicle, wherein an x axis, a y axis, and a z axis are defined which are perpendicular to one another. The motor bearing assembly comprises a motor bearing with a housing to be secured to the vehicle body and a stop buffer which protrudes from the housing parallel to the z axis, said stop buffer having an end face outside of the housing. An engine support mounting is to be connected to the engine, said engine support mounting having a base surface which faces the end face. A securing element protrudes through the end face parallel to the z axis and connects the engine support mounting to the motor bearing. The engine support mounting has at least one heat protection side element, said at least one heat protection side element together with the base surface completely covering the end face.

14 Claims, 4 Drawing Sheets

(58) Field of Classification Search
USPC .......................................................... 180/291
See application file for complete search history.

(56) References Cited

U.S. PATENT DOCUMENTS

| | | | | |
|---|---|---|---|---|
| 2003/0214085 | A1 | 11/2003 | Makino et al. | |
| 2004/0182631 | A1* | 9/2004 | Miyamoto ........... | B60K 5/1208 180/291 |

FOREIGN PATENT DOCUMENTS

| | | | |
|---|---|---|---|
| DE | 10 2009 031 335 | A1 | 1/2011 |
| GB | 2 088 997 | A | 6/1982 |
| JP | 62-88833 | A | 4/1987 |
| JP | 2000-2298 | A | 1/2000 |
| JP | 2004-276764 | A | 10/2004 |

OTHER PUBLICATIONS

German-language Written Opinion (PCT/ISA/237) issued in PCT Application No. PCT/EP2022/077710 dated Feb. 21, 2023 with English translation (8 pages).

German-language Search Report issued in German Application No. 10 2021 129 638.2 dated Aug. 12, 2022 with partial English translation (10 pages).

* cited by examiner

MOTOR BEARING ASSEMBLY FOR A VEHICLE

BACKGROUND AND SUMMARY

The present disclosure relates to a motor bearing assembly for mounting a motor in a vehicle. The motor is in particular an internal combustion motor. Furthermore, the disclosure relates to a vehicle having the motor bearing assembly.

In vehicles, for example passenger motor vehicles, the motors are usually connected to the body by way of three motor bearings. The individual motor bearing usually has a stop buffer made of rubber, which in the event of a correspondingly large relative movement between the motor and the body, can impact on the housing of the motor bearing. Depending on the positioning of the motor bearing, the stop buffer can be exposed to a relatively high thermal stress by the motor per se or the exhaust system.

It is an object of the present disclosure to specify a motor bearing assembly for a vehicle, which enables the motor to be received in the vehicle in a low-maintenance and operationally reliable manner.

The disclosure shows a motor bearing assembly for a vehicle. The vehicle is in particular a two-track on-road vehicle, for example, a passenger motor vehicle. In order to further describe the disclosure, an X-axis, a Y-axis and a Z-axis are in each case defined so as to be mutually perpendicular. This coordinate system serves exclusively for describing the motor bearing assembly, and does not have to correlate with the coordinate system of the vehicle in any way. The motor bearing assembly comprises a motor bearing having a housing. The housing is designed to be fastened to the body of the vehicle. Furthermore, the motor bearing has a stop buffer. The stop buffer extends from the housing so as to be parallel to the Z-axis. In particular, the housing has an opening. The stop buffer extends from the housing through this opening. In particular, the stop buffer has a shell face which lies opposite the periphery of this opening in the housing. In the event of a corresponding relative movement between the motor and the body, the stop buffer by way of its shell face can impact on the periphery of the opening of the housing. Furthermore, an end face is defined on the stop buffer. The end face forms in particular the end of the stop buffer. In particular, the end face extends in a plane perpendicular to the Z-axis, thus in particular in the XY-plane. The stop buffer is in particular made from an elastomer, for example rubber.

Furthermore, the motor bearing assembly comprises a motor support block. This motor support block is designed to be connected, in particular be screwed, to the motor. The motor is in particular an internal combustion motor. The motor support block has a base area. This base area faces the end face of the stop buffer. In particular, the base area rests on the end face.

Furthermore, the motor bearing assembly comprises a fastening element. The fastening element extends through the stop buffer so as to be parallel to the Z-axis, and protrudes outward through the end face of the stop buffer. The fastening element is designed to connect the motor support block to the motor bearing. It is provided in particular that the fastening element is designed as a constituent part of the motor bearing. The fastening element particularly preferably has a polygonal, for example quadrangular, cross section. The motor support block is attached to this fastening element and in particular connected to the fastening element by way of a corresponding locking pin, for example a threaded connection.

The base area of the motor support block lies opposite the end face of the stop buffer, in particular resting on the latter, but does not fully cover the end face. Therefore, the motor support block has at least one heat protection wing. The at least one heat protection wing, or the plurality of heat protections wings, conjointly with the base area, fully covers/cover the end face of the stop buffer. This results in an ideally low thermal stress, in particular in a motor bearing assembly that is disposed relatively close to the hot end below the internal combustion motor.

The at least one heat protection wing is preferably an integral constituent part of the motor support block, so that this results in a simple production and assembly with few parts. In particular, the motor support block is a metal casting, and the at least one heat protection wing is correspondingly an integral constituent part of the casting.

The motor support block particularly preferably has two mutually opposite heat protection wings. The locking pin mentioned, which connects the motor support block to the fastening element, extends in particular so as to be parallel to the X-axis. When viewing the motor bearing assembly in the direction of the X-axis, the two heat protection wings are preferably situated to the left and the right of the locking pin.

The base area of the motor support block preferably has a base area width. The end face preferably has an end face width. A span, which describes in particular the spacing of the outer edges of the two mutually opposite heat protection wings, is defined on the motor support block. The base area width, the end face width and the span are preferably all mutually parallel. These variables are particularly preferably measured parallel to the Y-axis, thus in particular perpendicularly to the locking pin. It is preferably provided that the end face width is larger than the base area width, but smaller than the span. As a result, only part of the end face is covered by the base area; the full coverage is a result of the interacting between the base area and the heat protection wings.

In terms of the Z-axis, the heat protection wings are disposed so as to be ideally close to the end face, in particular contacting the end face. It is preferably provided that the at least one heat protection wing, in particular all heat protection wings used, is/are spaced apart from the end face by at most 10 mm, preferably at most 5 mm.

The at last one heat protection wing, in particular all heat protection wings used, has/have a thickness parallel to the Z-axis. This thickness is preferably at most 20 mm, particularly preferably at most 10 mm. As a result, the heat protection wings serve exclusively as heat protection and not, for instance, as stiffening of the motor support block or as connection between the motor support block and the motor bearing.

The disclosure furthermore relates to a vehicle. As described, the vehicle herein is in particular a two-track vehicle, for example a passenger motor vehicle. The vehicle comprises a motor. The motor is in particular an internal combustion motor. Furthermore provided is one of the motor bearing assemblies described. The housing herein is connected, in particular screwed, to the body. The motor support block is connected, in particular screwed, to the motor.

It is particularly preferably taken into account when mounting the motor in the vehicle that a relatively high thermal stress arises only at one motor bearing, specifically at the hot end, or close to the exhaust system. This is the case in particular in a motor installed in the vehicle longitudinal direction. Therefore, the motor is preferably mounted on the body by way of exactly one motor bearing assembly according to the disclosure, having heat protection wing(s). At two other points, the motor is mounted by way of conventional motor bearing assemblies without heat protection wings.

BRIEF DESCRIPTION OF THE DRAWINGS

Further details, features and advantages of the disclosure are derived from the description hereunder and the figures.

DETAILED DESCRIPTION OF THE DRAWINGS

Figure 1:
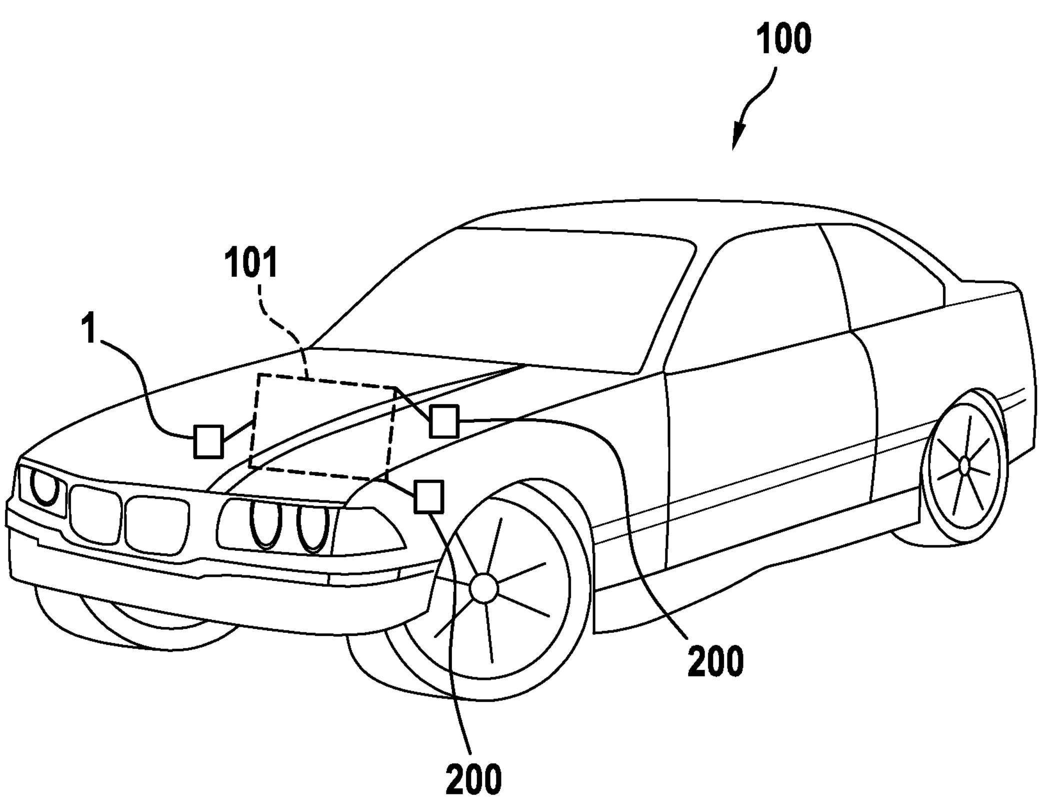
FIG. 1 shows a vehicle according to the disclosure having a motor bearing assembly according to the disclosure and according to one exemplary embodiment.

A vehicle 100 having a motor bearing assembly 1 will be described in detail with reference to FIGS. 1 to 3. In the vehicle 100, the motor 101, in particular the internal combustion motor, can preferably be mounted using only one motor bearing assembly 1 according to the disclosure and two conventional motor bearing assemblies 200 according to the prior art. However, it is also possible for the motor 101 to be mounted using a plurality of motor bearing assemblies 1 according to the disclosure.

Figure 2:
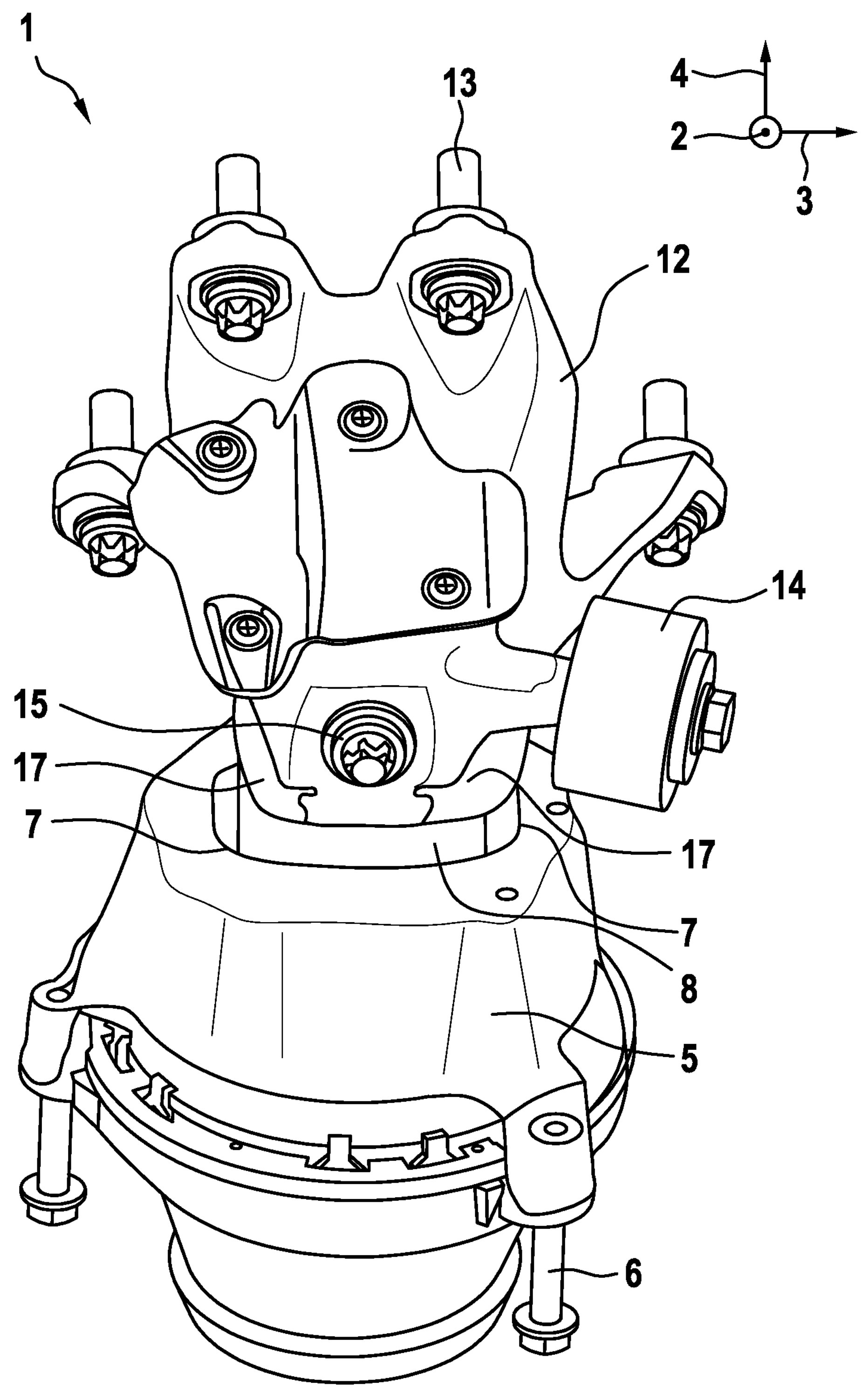
FIG. 2 shows a perspective view of the motor bearing assembly according to the disclosure and according to the exemplary embodiment.
Figure 3:
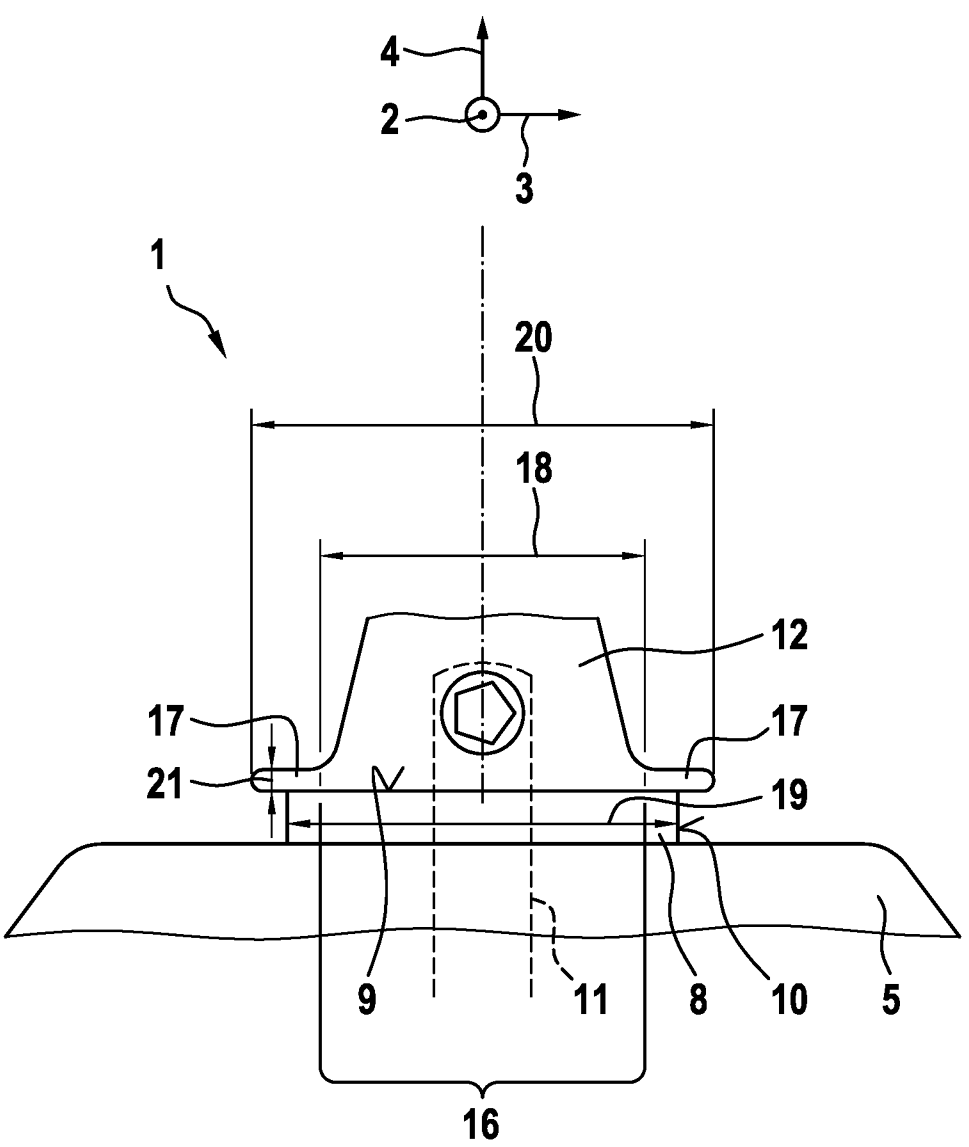
FIG. 3 shows a schematic lateral view of a detail of the motor bearing assembly according to the disclosure and according to the exemplary embodiment; and, FIG. 4 shows a motor bearing assembly according to the prior art.

According to FIGS. 2 and 3, a coordinate system having an X-axis 2, a Y-axis 3 and a Z-axis 4 is defined on the motor bearing assembly 1.

The motor bearing assembly 1 comprises a motor baring having a housing 5 which by way of a corresponding threaded body connection 6 is to be connected to the body of the vehicle 100. An opening 7 is provided in the housing 5.

Figure 4:
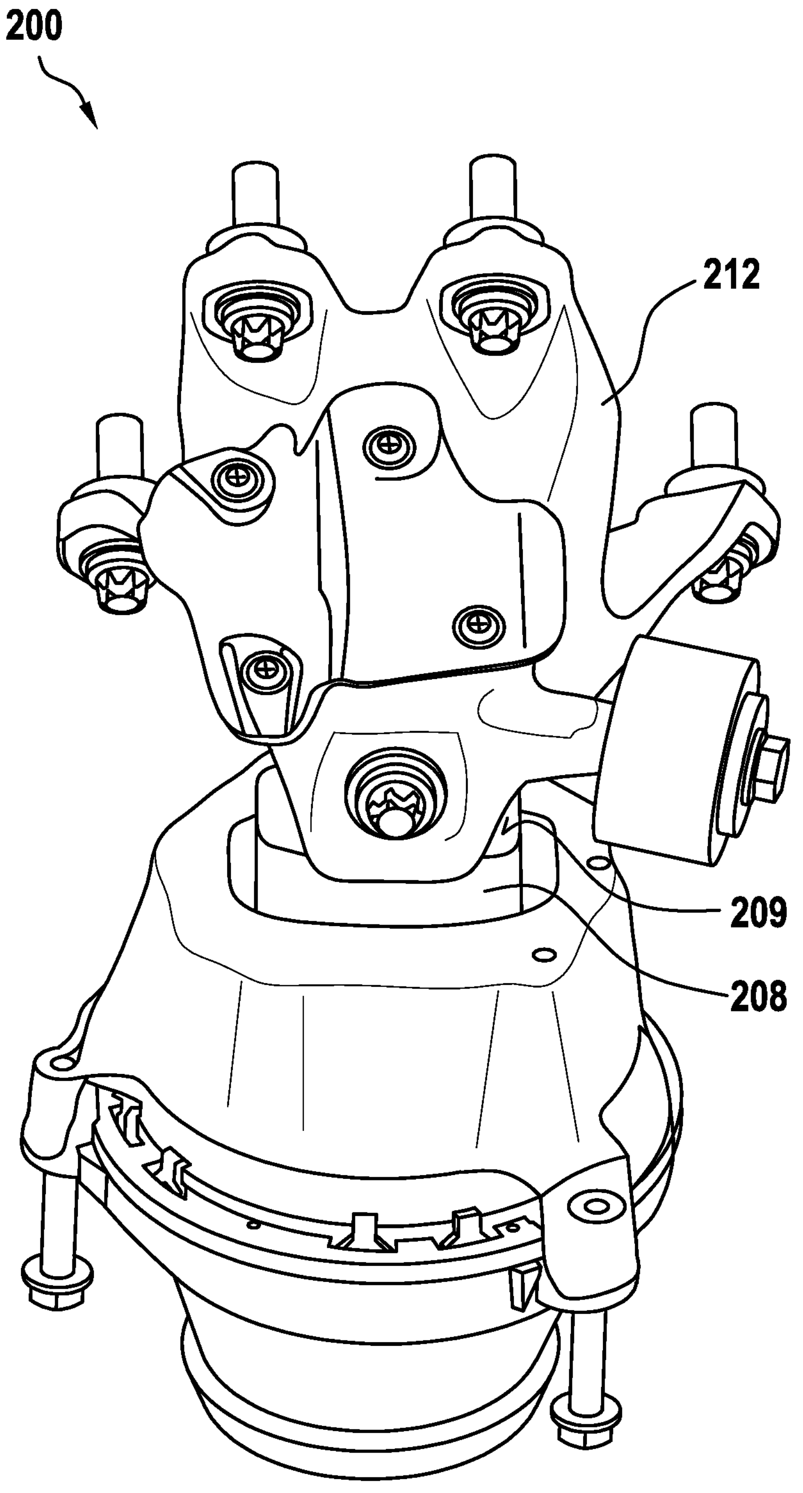

A stop buffer 8 extends along the Z-axis 4 and through the opening 7 from the housing 5. The stop buffer 8 has a shell face 10 which lies opposite the periphery of the opening 7, as can be seen in FIG. 4, for example. The stop buffer 8 ends by way of an end face 9 which extends substantially in the XY-plane.

Illustrated by dashed lines, FIG. 3 highlights the profile of a fastening element 11 which as a constituent part of the motor bearing protrudes from the housing 5. The fastening element 11 in the process penetrates the stop buffer 8 and protrudes from the end face 9.

The motor support block 12 is attached to the fastening element 11 and fastened via a locking pin 15, designed as a threaded connection, for example. The locking pin 15 extends so as to be parallel to the X-axis 2, and penetrates the fastening element 11.

The motor support block 12 is connected to the motor 101 by way of a corresponding threaded motor connection 13. Furthermore, the motor support block 12 can have an absorber 14, as is shown in FIG. 2, for example.

The side of the motor support block 12 that faces the end face 9 is referred to as the base area 16 in the context of the disclosure. FIG. 4 shows an assembly according to the prior art. A stop buffer 208 having a corresponding end face 209 is likewise provided in the motor bearing assembly 200 shown there. The motor support block 212 according to the prior art herein has a relatively small base area which does not completely cover the end face 209. As a result, a relatively high thermal stress acting on the stop buffer 8 can occur by way of the end face 209.

As opposed to the prior art according to FIG. 4, the motor support block 12 according to the present disclosure, shown in FIGS. 2 and 3, has two mutually opposite heat protection wings 17. The two heat protection wings 17 are integral constituent parts of the cast motor support block 12.

The two heat protection wings 17 extend substantially in the XY-plane and thus perpendicularly to the Z-axis 4. The face of the motor support block 12 that faces the end face 9 is enlarged as a result of the two heat protection wings 17, so that the complete end face 9 is covered by the base area 16 conjointly with the two heat protection wings 17.

FIG. 3 shows in a purely schematic manner that the base area 16 parallel to the Y-axis 3 has a base area width 18. This base area width 18 is smaller than an end face width 19 of the end face 9, likewise defined so as to be parallel to the Y-axis 3. However, as a result of the heat protection wings 17 used, the motor support block 12 on its side that faces the stop buffer 8 extends across a span 20 which is likewise defined so as to be parallel to the Y-axis 3 and is larger than the end face width 19.

A thickness 21 of the heat protection wings 17 parallel to the Z-axis 4 extends across a few millimeters, so that the heat protection wings 17 serve only as heat protection and do not contribute toward the stability of the motor support block 12, for instance.

LIST OF REFERENCE SIGNS

1 Motor bearing assembly
2 X-axis
3 Y-axis
4 Z-axis
5 Housing
6 Threaded body connection
7 Opening
8 Stop buffer
9 End face
10 Shell face
11 Fastening element
12 Motor support block
13 Threaded motor connection
14 Absorber
15 Locking pin
16 Base area
17 Heat protection wing
18 Base area width
19 End face width
20 Span
21 Thickness
100 Vehicle
101 Motor
200 Motor bearing assembly according to the prior art
208 Stop buffer according to the prior art
209 End face according to the prior art
212 Motor support block according to the prior art

What is claimed is:

1. A motor bearing assembly for a vehicle, wherein an X-axis, a Y-axis and a Z-axis are in each case defined so as to be mutually perpendicular, the motor bearing assembly comprising:

a housing to be fastened to a body, and a stop buffer which protrudes from the housing so as to be parallel to the Z-axis, wherein the stop buffer outside the housing has an end face;

a motor support block which is to be connected to a motor, wherein the motor support block has a base area that faces the end face;

a fastening element which protrudes through the end face so as to be parallel to the Z-axis, and connects the motor support block to a motor bearing;

a locking pin inserted through the motor support block and through the fastening element so as to be parallel to the X-axis;

wherein the motor support block has at least one heat protection wing, wherein the at least one heat protection wing, conjointly with the base area, completely covers the end face.

2. The motor bearing assembly according to claim 1, wherein the at least one heat protection wing is an integral constituent part of the motor support block.

3. The motor bearing assembly according to claim 1, wherein the at least one heat protection wing comprises two mutually opposite heat protection wings.

4. The motor bearing assembly according to claim 1, wherein the base area has a base area width, wherein the end face has an end face width, wherein the motor support block including the at least one heat protection wing has a span defined as a spacing of outer edges of the at least one heat protection wing, and wherein the end face width is larger than the base area width and smaller than the span.

5. The motor bearing assembly according to claim 4, wherein the base area width, the end face width, and the span are defined to be parallel to the Y-axis and perpendicular to the locking pin.

6. The motor bearing assembly according to claim 1, wherein the at least one heat protection wing parallel to the Z-axis has a thickness of up to 20 mm.

7. The motor bearing assembly according to claim 6, wherein the at least one heat protection wing parallel to the Z-axis has a thickness of up to 10 mm.

8. A vehicle comprising a motor and the motor bearing assembly according to claim 1.

9. The vehicle according to claim 8, wherein the motor is mounted by way of exactly one of the motor bearing assembly according to claim 1 and two further motor bearing assemblies without heat protection wings.

10. The motor bearing assembly according to claim 1, wherein the motor support block is a metal casting, and the at least one heat protection wing is an integral constituent part of the casting.

11. The motor bearing assembly according to claim 1, wherein the at least one heat protection wing extends substantially in an XY-plane perpendicular to the Z-axis.

12. The motor bearing assembly according to claim 1, wherein the at least one heat protection wing is spaced apart from the end face by at most 10 mm.

13. The motor bearing assembly according to claim 12, wherein the at least one heat protection wing is spaced apart from the end face by at most 5 mm.

14. The motor bearing assembly according to claim 1, wherein the at least one heat protection wing contacts the end face.

* * * * *